United States Patent
Matsumoto et al.

(10) Patent No.: US 9,725,671 B2
(45) Date of Patent: Aug. 8, 2017

(54) LUBRICANT FILM-FORMING COMPOSITION AND SCREW JOINT FOR STEEL PIPE

(71) Applicants: NIPPON STEEL & SUMITOMO METAL CORPORATION, Tokyo (JP); VALLOUREC OIL AND GAS FRANCE, Aulnoye-Aymeries (FR)

(72) Inventors: Keishi Matsumoto, Takarazuka (JP); Kunio Goto, Kobe (JP); Masayoshi Sasaki, Wakayama (JP)

(73) Assignees: NIPPON STEEL & SUMITOMO METAL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 0 days.

(21) Appl. No.: 14/915,059

(22) PCT Filed: Sep. 2, 2014

(86) PCT No.: PCT/JP2014/073010
§ 371 (c)(1),
(2) Date: Feb. 26, 2016

(87) PCT Pub. No.: WO2015/030252
PCT Pub. Date: Mar. 5, 2015

(65) Prior Publication Data
US 2016/0208194 A1    Jul. 21, 2016

(30) Foreign Application Priority Data

Sep. 2, 2013    (JP) .................................. 2013-181623

(51) Int. Cl.
*C10M 169/00*    (2006.01)
*C10M 105/34*    (2006.01)
(Continued)

(52) U.S. Cl.
CPC ........ *C10M 169/04* (2013.01); *C10M 105/26* (2013.01); *C10M 125/02* (2013.01);
(Continued)

(58) Field of Classification Search
CPC ...... C10N 2220/022; C10M 2207/281; C10M 2207/125
(Continued)

(56) References Cited

U.S. PATENT DOCUMENTS

2003/0144158 A1    7/2003  Petelot
2007/0149422 A1 *  6/2007  Miyajima ............ C10M 159/06
                                                508/451

(Continued)

FOREIGN PATENT DOCUMENTS

EP    2 210 931 A1    7/2010
JP    2001-139975 A   5/2001
(Continued)

OTHER PUBLICATIONS

International Search Report for PCT/JP2014/073010 mailed on Nov. 18, 2014.
(Continued)

*Primary Examiner* — Vishal Vasisth
(74) *Attorney, Agent, or Firm* — Birch, Stewart, Kolasch & Birch, LLP

(57) ABSTRACT

A lubricant film-forming composition includes as a composition: 40 to 80 mass % of a base oil consisting of one or more selected from pentaerythritol fatty acid ester and trimethylolpropane fatty acid ester; 5 to 20 mass % of a solidifying agent consisting of paraffin wax; and 10 to 40 mass % of a solid lubricant consisting of one or more selected from alkali metal salt of hydroxystearic acid and alkali earth metal salt of hydroxystearic acid. A total content of the base oil, the solidifying agent, and the solid lubricant
(Continued)

is 85 mass % or more and 100 mass % or less, and the lubricant film-forming composition does not contain heavy metals.

8 Claims, 3 Drawing Sheets

(51) Int. Cl.
| | | |
|---|---|---|
| *C10M 169/04* | (2006.01) | |
| *C10M 169/06* | (2006.01) | |
| *C10M 105/26* | (2006.01) | |
| *C10M 125/02* | (2006.01) | |
| *C10M 127/00* | (2006.01) | |
| *C10M 129/06* | (2006.01) | |
| *E21B 17/042* | (2006.01) | |
| *F16L 57/06* | (2006.01) | |
| *F16B 33/06* | (2006.01) | |

(52) U.S. Cl.
CPC ........ *C10M 127/00* (2013.01); *C10M 129/06* (2013.01); *E21B 17/042* (2013.01); *F16L 57/06* (2013.01); *C10M 2205/16* (2013.01); *C10M 2205/163* (2013.01); *C10M 2207/128* (2013.01); *C10M 2207/1285* (2013.01); *C10M 2207/2835* (2013.01); *C10N 2230/06* (2013.01); *C10N 2230/12* (2013.01); *C10N 2240/22* (2013.01); *C10N 2250/10* (2013.01); *F16B 33/06* (2013.01)

(58) Field of Classification Search
USPC .................................. 508/110, 463, 534, 519
See application file for complete search history.

(56) References Cited

U.S. PATENT DOCUMENTS

| | | | | |
|---|---|---|---|---|
| 2008/0277925 | A1* | 11/2008 | Goto | .................... C10M 103/00 285/94 |
| 2012/0302472 | A1* | 11/2012 | Litters | .................. C10M 135/10 508/122 |
| 2014/0284919 | A1 | 9/2014 | Goto et al. | |

FOREIGN PATENT DOCUMENTS

| | | |
|---|---|---|
| JP | 2002-173692 A | 6/2002 |
| JP | 2004-53013 A | 2/2004 |
| JP | 2004-507698 A | 3/2004 |
| JP | 2008-95019 A | 4/2008 |
| JP | 2008-537062 A | 9/2008 |
| JP | 2013-108656 A | 6/2013 |
| WO | 99/36387 A1 | 7/1999 |
| WO | WO 2004/081156 A1 | 9/2004 |
| WO | WO 2006/104251 A1 | 10/2006 |
| WO | WO 2009/057754 A1 | 5/2009 |

OTHER PUBLICATIONS

Written Opinion of the International Searching Authority for PCT/JP2014/073010 (PCT/ISA/237) mailed on Nov. 18, 2014.
Japanese Notice of Allowance and English translation thereof, dated Sep. 13, 2016, for counterpart Japanese Application No. 2015-534368.
Extended European Search Report for European Application No. 14839947.0, dated Mar. 24, 2017.

* cited by examiner

LUBRICANT FILM-FORMING COMPOSITION AND SCREW JOINT FOR STEEL PIPE

This application is a 371 of PCT/JP2014/073010, filed Sep. 2, 2014.

TECHNICAL FIELD OF THE INVENTION

The present invention relates to a lubricant film-forming composition and a screw joint for a steel pipe.

Priority is claimed on Japanese Patent Application No. 2013-181623, filed Sep. 2, 2013, the contents of which are incorporated herein by reference.

RELATED ART

An oil well pipe, which is used to drill an oil well and includes tubing through which a fluid such as crude oil flows and a casing that surrounds the tubing, is generally assembled by fastening steel pipes having lengths of about several tens of meters with screw joints at a site. Typically, the depth of an oil well is 2,000 m to 3,000 m. However, in recent years, the depth of a deep oil well such as an undersea oil well may reach 8,000 m to 10,000 m.

On the screw joint for a steel pipe which fastens the oil well pipes, in addition to an axial tensile force caused by the weight of the oil well pipes and the joint under the use environment, a complex pressure such as internal and external contact pressure, and heat are applied. Therefore, for the screw joint for a steel pipe, maintaining airtightness is required without breakage under such severe environments.

Furthermore, during an operation of lowering the tubing and the casing, there is a case that the joint which is fastened once is loosened and re-fastened. API (American Petroleum Institute) requires the maintenance of airtightness without the occurrence of irreparable seizure called galling even when fastening (make-up) and loosening (break-out) are performed ten times in the tubing joint and three times in the casing joint.

As a screw joint for a steel pipe having excellent sealing properties, there is a screw joint having a pin-box structure in which a pin including a male threaded portion and an unthreaded metal contact portion (a seal portion and a shoulder portion) which are formed on the outer surface of a pipe end of the steel pipe and a box of a coupling of an additional member including a female threaded portion and an unthreaded metal contact portion (a seal portion and a shoulder portion) which are formed on the inner surface are fitted and screwed together to cause the seal portions of both of the unthreaded metal contact portions to be fitted together and abut each other.

In order to enhance lubricity and airtightness, grease lubricating oil which is called compound grease containing a large amount of heavy metal powder such as Pb or Zn is applied to the threaded portion and the unthreaded metal contact portion which constitute a fitting part before the fastening. In order to achieve good holding properties of the compound grease, a surface treatment (for example, phosphate treatment) for increasing the surface roughness of the fitting part of the screw joint for a steel pipe has been performed. Since the compound grease has excellent antirust properties as well as airtightness and lubricity, the screw joint which may be exposed to severe environments during storage can be protected from rust.

Recently, in the wake of the OSPAR Convention (Oslo and Paris Conventions, OSPAR) for the prevention of ocean pollution of the Northeast Atlantic Ocean that has been in effect since 1998, environmental restrictions have become strictly on a global scale. Even in drilling operations of gas wells or oil wells by an offshore rig, in order to minimize the discharge amount of causative substances of ocean pollution, in regards to materials used in the rigs which have a possibility of being discharged to the environment, it is required to evaluate the degree of environmental effects, and there is a tendency to prohibit the use of materials that do not satisfy the standards of the corresponding country or region.

The evaluation items of the degree of environmental effects are specified as Harmonized Offshore Chemical Notification Format (HOCNF) set by OSPAR. The evaluation of biochemical oxygen demand (BOD) is an important item in the indices of biodegradability.

In the screw joint for a steel pipe, the above-described compound grease which contains a large amount of heavy metal powder such as Pb or Zn is an object of regulation because a film thereof has a possibility of being exfoliated during an application or cleaning operation by the rig and being discharged to the surroundings. Therefore, a composition for forming a lubricant film on the fitting part of the screw joint for a steel pipe without applying the compound grease is proposed in following Patent Documents 1 to 3.

However, biodegradability which has become an important evaluation item nowadays is not considered in the above-described lubricant film-forming composition for a screw joint proposed in the following Patent Documents 1 to 3, although lubricity and corrosion resistance are considered.

PRIOR ART DOCUMENTS

Patent Document

[Patent Document 1] Japanese Unexamined Patent Application, First Publication No. 2002-173692

[Patent Document 2] Japanese Unexamined Patent Application, First Publication No. 2004-53013

[Patent Document 3] Published Japanese Translation No. 2004-507698 of the PCT International Publication

[Patent Document 4] Japanese Unexamined Patent Application, First Publication No. 2008-95019

DISCLOSURE OF THE INVENTION

Problems to be Solved by the Invention

A lubricant film-forming composition for a screw joint, of which the biodegradability is considered, is disclosed in Patent Document 4, but the biodegradability is not sufficient.

Grease, of which the biodegradability is considered (which is generally called biodegradable grease), is also known. However, since the biodegradable grease in the related art is designed for the purpose of lubricating a bearing, lubricity is insufficient for severe sliding conditions during the fastening of the screw joint for a steel pipe, and antirust properties against exposure at a use site is also insufficient.

In addition, there may be cases where copper plating is performed on the screw joint for a steel pipe to prevent seizure during fastening. However, there is a problem in that lubricant film components contained in the biodegradable grease in the related art easily corrode copper.

The present invention has been made taking the forgoing circumstances into consideration, and an object of the present invention is to provide a lubricant film-forming composition having excellent lubricity, antirust properties, biodegradability, stickiness resistance, and corrosiveness to copper and a screw joint for a steel pipe having the lubricant film-forming composition.

Means for Solving the Problem

The gist of the present invention is as follows.

(1) According to a first aspect of the invention, a lubricant film-forming composition includes as a composition: 40 to 80 mass % of a base oil consisting of one or more selected from pentaerythritol fatty acid ester and trimethylolpropane fatty acid ester; 5 to 20 mass % of a solidifying agent consisting of paraffin wax; and 10 to 40 mass % of a solid lubricant consisting of one or more selected from alkali metal salt of hydroxystearic acid and alkali earth metal salt of hydroxystearic acid. A total content of the base oil, the solidifying agent, and the solid lubricant is 85 mass % or more and 100 mass % or less, and the lubricant film-forming composition does not contain heavy metals.

(2) In the lubricant film-forming composition described in (1), the base oil may consist of one or more selected from pentaerythritol tetraoleate, trimethylol propane trioleate, and trimethylol propane triisostearate.

(3) In the lubricant film-forming composition described in (1) or (2), the solid lubricant may consist of one or more selected from calcium hydroxystearate, lithium hydroxystearate, and sodium hydroxystearate.

(4) According to a second aspect of the invention, in a screw joint for steel pipe, the screw joint includes a pin and a box, each of the pin and the box has a threaded portion and an unthreaded metal contact portion as fitting parts. The screw joint for steel pipe is provided with a lubricant film, which is formed of the lubricant film-forming composition described in (1) to (3), on a surface of the fitting part of at least one of the pin and the box.

In addition, in the present invention, "pentaerythritol fatty acid ester" and "trimethylolpropane fatty acid ester" mean complete esters of polyols, that is, a "tetra-fatty acid ester of pentaerythritol" and a "tri-fatty acid ester of trimethylolpropane".

Effects of the Invention

According to the aspects, it is possible to provide a lubricant film-forming composition having excellent lubricity, antirust properties, biodegradability, stickiness resistance, and corrosiveness to copper and a screw joint for a steel pipe having the lubricant film-forming composition.

EMBODIMENTS OF THE INVENTION

Figure 1:
FIG. 1 is an explanatory view schematically showing a configuration in which an oil well pipe and a coupling are assembled at the shipping of the oil well pipe.

First, examination results for accomplishing the object of the present invention will be described. Thereafter, embodiments of a lubricant film-forming composition and a screw joint for a steel pipe of this embodiment will be described.

In order to accomplish the object of the present invention, the inventors have examined easch property required for a lubricant film of the screw joint for a steel pipe. Hereinafter, the examination results will be simply described.

[Biodegradability]

In order to evaluate environmental effects on the ocean, as a method of evaluating biodegradability in seawater, an appropriate method is employed among any of the following methods that are generally employed depending on the evaluation of a specimen.

(a) OECD Guidelines for testing of chemicals—1992 OECD 306: Biodegradability in Seawater, Closed Bottle Method.

(b) Modified seawater variant of ISO TC/147, SC5/WG4 N141 1990: BOD test for insoluble substances.

In any of the above-described evaluation methods, test results are typically expressed as percentages on the basis of an amount of reduced dissolved oxygen (for example, BOD=15%), and as the value is high, biodegradability is preferable and the effect to the environment is small.

As the condition of biodegradability, even in a case where a test is conducted by any of the above-described methods, a BOD value (hereinafter, referred to as $BOD_{28}$) after 28 days may be 20% or higher. Here, the BOD is an index which represents biodegradability in seawater. At present, the requested BOD value is varied by country and region. However, when the $BOD_{28}$ is 20% or higher, it can satisfy the minimum requested level (red) for the approval of using on an offshore rig even in the standard established by Norway which has the strictest standard. In order to satisfy the standard at a level (yellow) with higher suitability, the $BOD_{28}$ practically needs to be 60% or higher.

As a lubricating oil component used in a semi-dry film in the related art, there are basic oils such as basic sulfonates, basic salicylates, basic phenates, and basic carboxylates proposed in above-described Patent Documents 2 and 4. However, the $BOD_{28}$ of such a lubricating oil component is higher than 20%, but is far below 60%.

As a lubricating oil with a $BOD_{28}$ of higher than 60%, there is a vegetable oil (having excellent biodegradability), that is, a polyol fatty acid ester.

[Lubricity]

In the semi-dry film in the related art, basic sulfonates, basic salicylates, basic phenates, and basic carboxylates are used as lubricating oil components. The lubricity of such compounds is excellent.

Among the above-described polyol fatty acid esters, those having particularly excellent lubricity are a pentaerythritol fatty acid ester, a trimethylolpropane fatty acid ester, and a glycerin fatty acid ester. Among these, the lubricity of pentaerythritol tetraoleate, trimethylol propane trioleate, and trimethylol propane triisostearate is excellent.

The lubricity of the film can be increased by adding a solid lubricant to the lubricating oil. In view of biodegradability, as the solid lubricant, alkali metal salts or alkali earth metal salts of a hydroxystearic acid are preferable. Among these, calcium hydroxystearate, lithium hydroxystearate, and sodium hydroxystearate are preferable.

[Antirust Properties]

Antirust properties were evaluated by a salt spray test specified in JIS Z2371. Basic sulfonates, basic salicylates, basic phenates, and basic carboxylates which are the lubricating oil components used in the semi-dry film in the related art also have excellent antirust properties.

The antirust properties are not considered in commercially available biodegradable grease and biodegradable lubricating oil having excellent biodegradability. Therefore, the commercially available biodegradable grease and biodegradable lubricating oil have poor antirust properties in the salt spray test.

Most of the above-described polyol fatty acid esters have poor antirust properties. However, among these, it was determined that the pentaerythritol fatty acid ester and the trimethylolpropane fatty acid ester has excellent antirust properties. In most of the polyol fatty acid esters, the fatty acid ester is hydrolyzed and enters a state where moisture easily permeates therethrough, and thus antirust properties are reduced. However, it is considered that the pentaerythritol fatty acid ester and the trimethylolpropane fatty acid ester have high hydrolysis resistance, that is, high water resistance, and thus have high antirust properties.

[Stickiness Resistance]

During the fastening of oil well pipes on a rig, when the oil well pipes are allowed to stand upright, rust which adheres to the inner surfaces of the pipes and blasting particles which are inserted to remove the rust may fall, and in a state where the rust or the blasting particles adhere to a threaded portion or an unthreaded metal contact portion, there is a case that a pin and a box are fastened together. Therefore, nonoccurrence of stickiness is required so that foreign matter does not adhere to a lubricant film applied to the surface of the threaded portion.

In general, stickiness does not occur on the surface of the lubricant film made of a solid film, and foreign matter is less likely to adhere thereto. However, the solid film does not have a self-repairing function that a liquid lubricant film has, which will be described later, when metal under the film is exposed due to small scratches generated in the lubricant film during fastening or loosening, significant seizure occurs within a short period of time.

On the other hand, when a lubricant film made of a liquid is used, even when small scratches are generated, the liquid lubricant film immediately covers the scratched portions, and thus intense seizure does not occur. This effect is called a self-repairing function of a liquid lubricant. The lubricity of the liquid lubricant is affected by the lubricity of the lubricant itself and also by the superiority of the self-repairing function.

As a technique for achieving both the lubricity of the liquid lubricant by the self-repairing function and the stickiness resistance of the solid film, there is a technique of mixing a liquid lubricating oil with a wax which is an oil-based solid to form a semi-solid (a semi-dry film technique). As a compound for forming the semi-solid, in view of the lubricity and mixing properties, an oil-based wax is preferable. In view of the biodegradability, paraffin wax is most preferable as a compound for semi-solidifying.

[Corrosiveness to Copper]

There may be cases where copper plating is performed on the screw joint for a steel pipe to prevent seizure during fastening. In this case, there is a possibility that copper having a high activity may be corroded by a lubricant film component. The biodegradable grease and the polyol fatty acid esters having high biodegradability have a tendency to have high corrosiveness to copper. However, it was determined that the pentaerythritol fatty acid ester and the trimethylolpropane fatty acid ester have low corrosiveness to copper. This is because corrosion of copper by the fatty acid ester proceeds as the fatty acid ester is hydrolyzed first and then the hydrolyzed fatty acid reacts with the copper to form fatty acid copper. Therefore, the pentaerythritol fatty acid ester and trimethylolpropane fatty acid ester having high hydrolysis resistance as described above also have low corrosiveness to copper.

Hereinafter, the embodiments of the lubricant film-forming composition and the screw joint for a steel pipe of this embodiment will be described in detail. In the following description, % related to a composition is mass % if not particularly specified.

Initially, components contained in the lubricant film-forming composition of this embodiment will be described.

[Base Oil]

In the composition of this embodiment, as a base oil which is a main agent of a lubricity enhancing component, a pentaerythritol fatty acid ester and a trimethylolpropane fatty acid ester shown in the following Expression 1 can be used.

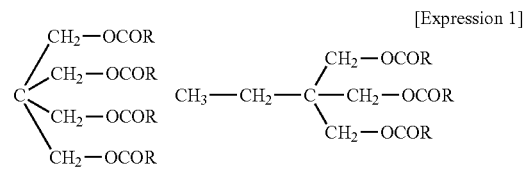

[Expression 1]

pentaerythritol fatty acid ester    trimethylolpropane fatty acid ester

In the Expression 1, R is a fatty acid residue, that is, a saturated or unsaturated straight-chain or branched-chain aliphatic group. That is, the R group may include one or two or more double bonds or triple bonds. When the number of carbon atoms of the R group is too small, the ratio of a polar group in a molecule is increased, and the mixing properties or dispersibility with other oil-based components is degraded. In addition, when the number of carbon atoms of the R group is too small, the viscosity of the base oil is significantly reduced, and thus film strength of the formed film may be reduced, resulting in the degradation of lubricity. In addition, stickiness resistance is also degraded.

On the other hand, when the number of carbon atoms of the R group is too large, the polar ratio in the molecule becomes too low, and mixing properties or dispersibility of an aqueous component is degraded. In addition, when the number of carbon atoms of the R group is too large, the viscosity of the base oil becomes too high, and thus blending of other components may become difficult or applying the components may become extremely difficult. Furthermore, when the number of carbon atoms of the R group is too large, the viscosity of the film becomes too high, and thus the self-repairing function is degraded, resulting in poor lubricity.

For the above-described reasons, the number of carbon atoms of the R group may be in a range of 3 to 20, preferably 12 to 18, even more preferably 16 to 18, and most preferably 17.

Among these, an oleic acid is preferable as a fatty acid to be combined with pentaerythritol, and an oleic acid and an isostearic acid are preferable as a fatty acid to be combined with trimethylolpropane.

It is thought that the base oil is oriented and adsorbed onto a screw surface at a part of the polar group and thus forms an adsorption layer. At this time, when there is a double bond like the oleic acid, the movement is confined in a double bond portion of the R group. Therefore, resistance to a load is high, and the intrusion of water can be impeded. In addition, since the carbon chain of the isostearic acid is divided into two sections, the individual carbon chains are short and thus are densely oriented when being adsorbed. Therefore, resistance to a load is high, and the intrusion of water can be impeded.

Accordingly, it is thought that the oleic acid or the isostearic acid is preferable as a fatty acid portion of the base oil. In addition, although the reason is not clear, it is inferred that there is a three-dimensional problem in the combination of the isostearic acid and the pentaerythritol during orientation and adsorption and thus the combination thereof is degraded compared to the combination of the isostearic acid and the trimethylolpropane.

By combining the pentaerythritol and the oleic acid, pentaerythritol tetraoleate can be obtained. By combining trimethylpropane and the oleic acid, trimethylol propane trioleate can be obtained. By combining the trimethylpropane and the isostearic acid, trimethylol propane triisostearate can be obtained.

The fatty acid esters included in the base oil in the lubricant film-forming composition of this embodiment have excellent biodegradability, and thus have better lubricity, antirust properties, and corrosiveness to copper.

[Solidifying Agent]

The lubricant film-forming composition of this embodiment contains paraffin wax as a compound for increasing the stickiness resistance of the film. Other wax may also be used for solidification. However, in view of biodegradability and solidification performance, paraffin wax is preferable. A preferable paraffin wax used in this embodiment is a paraffin wax having a melting point of 45° C. or higher and 60° C. or lower. The form thereof is preferably a powder form as will be described later.

[Solid Lubricant]

In the lubricant film-forming composition of this embodiment, as an auxiliary compound for enhancing lubricity, a solid lubricant having high biodegradability is added. As the solid lubricant, alkali metal salts or alkali earth metal salts of a hydroxystearic acid are used. Among these, calcium hydroxystearate, lithium hydroxystearate, and sodium hydroxystearate are preferable. It is thought that these solid lubricants are soaps, and exhibit lubricity while being deformed under shearing even in an oil, and causes hydroxylation of the fatty acid portion of the base oil, thereby increasing biodegradability.

[Other Compounds]

In the lubricant film-forming composition of this embodiment, for the purpose of enhancing lubricity, antirust properties, and other kinds of performance, a small amount of other components may be added in addition to the base oil, the solidifying agent, and the solid lubricant described above. Regarding the biodegradation degree of a mixture as the lubricant film, additivity is established in the relationship between the biodegradation degree and the mass fraction of individual components, and thus other components may also be added in a range in which the biodegradability of the entire composition does not fall below 60%.

In a case where the total content of the base oil, the solidifying agent, and the solid lubricant in the lubricant film-forming composition of this embodiment is less than 85 mass % of the entire composition by adding the other components, there is a possibility that the biodegradability of the entire composition may be less than 60%. Therefore, the total amount of the base oil, the solidifying agent, and the solid lubricant in the lubricant film-forming composition of this embodiment needs to be 85 mass % or higher and 100 mass % or less in the entire composition.

In addition, the biodegradability of the entire composition is calculated by the value of the biodegradability which is the sum of the ratios of the components constituting the composition, that is, obtaining the product of the value of the biodegradability of each component and the content thereof and the sum of the products of the entirety of the components.

Examples of other components which can be used in this embodiment include a basic oil which has been used in the related art such as basic sulfonates, basic salicylates, basic phenates, and basic carboxylates, various extreme pressure additives, metal soap, wax other than paraffin wax, an oil-based agent, liquid polymers, organic fine powder such as PTFE or polyethylene, $SiO_2$, and carbon nanoparticles.

Here, when the lubricant film-forming composition of this embodiment includes a heavy metal, the heavy metal flows out to the surroundings during cleaning and causes environmental pollution. Therefore, the lubricant film-forming composition of this embodiment does not contain a heavy metal.

[Content]

The lubricant film-forming composition of this embodiment at least contains the base oil, the solidifying agent, and the solid lubricant. Regarding the amounts of the components, it is preferable that the base oil be in a range of 40 to 80 mass %, the solidifying agent be in a range of 5 to 20 mass %, and the solid lubricant be in a range of 10 to 40 mass % with respect to the entire lubricant film-forming composition (100%). More preferably, the base oil is in a range of 40 to 65 mass %, the solidifying agent is in a range of 5 to 10 mass %, and the solid lubricant is in a range of 10 to 25 mass % with respect to the entire lubricant film-forming composition (100%).

[Blending Method]

The lubricant film-forming composition of this embodiment is obtained by simply mixing the base oil, the solidifying agent, and the solid lubricant and stirring the mixture well to be uniform. In this case, it is preferable that the solidifying agent (paraffin wax) be supplied in a powdered state. In addition, it is preferable that the grain size of the powder be smaller than a film thickness when a film is formed which will be described later. The same applies to the grain size of the solid lubricant.

When other components are mixed in addition to the base oil, the solidifying agent, and the solid lubricant, a well-known mixing method may be used depending on the properties of the components.

In order to increase the stickiness resistance of the formed lubricant film, the temperature of the lubricant film-forming composition having uniformly mixed components is increased to a temperature of equal to or higher than the melting point of the paraffin wax in use to liquefy the paraffin wax, and the base oil and the liquefied paraffin wax may be mixed and thereafter be cooled. Increasing the temperature may be performed in a storage container before the application. Otherwise, the lubricant film-forming composition may be applied to the screw joint in a mixed state, and then the applied matter on the surface may be increased in temperature by a heater to be compatible and then cooled. In this case, the lubricant film in which the paraffin wax is distributed in the film at a substantially uniform concentration is formed.

As another technique, the lubricant film-forming composition of this embodiment may be a two-component type composition containing a mixture of other components rather than the paraffin wax which is the solidifying agent and the paraffin wax. In this case, a film is formed by applying the mixture other than the paraffin wax. The formed film has stickiness. When a predetermined amount of the paraffin wax is sprayed thereon and the paraffin wax is heated to a temperature of equal to or higher than the melting point of the paraffin wax to be mixed with the film, the concentration of the paraffin wax is increased toward the upper layer of the film. That is, the lubricant film in which the concentration of the paraffin wax is changed in the thickness direction of the film is obtained, and thus stickiness resistance is further enhanced.

[Screw Joint for Steel Pipe]

The lubricant film-forming composition of this embodiment is applied to the surface of a fitting part of at least one of a pin 1 and a box 2 in the screw joint for a steel pipe. Here, the pin 1 and the box 2 of the screw joint for a steel pipe respectively include threaded portions 3 and 4 and unthreaded metal contact portions 5 as fitting parts.

The screw joint for a steel pipe is typically shipped in the state shown in FIG. 1. That is, the screw joint for a steel pipe is shipped in a state in which one pin 1 of an oil well pipe A is fastened to a coupling B in advance. The oil pipe A is provided with pin 1 which has male threaded portions 3 at both ends. Coupling B is provided with box 2, which has female threaded portion 4, on the inner surface. In this figure, for the simplification of the figure, the unthreaded metal contact portion is omitted.

However, the configuration of the screw joint for a steel pipe is not limited to the configuration shown in FIG. 1. An integral type screw joint for a steel pipe in which the pin 1 having the male threaded portion 3 is formed on the outer surface of one end of an oil well pipe and the box 2 having the female threaded portion 4 is formed on the inner surface of the other end thereof is used. This screw joint for a steel pipe does not need the coupling B for fastening. In addition, the box 2 may be formed in the oil well pipe A and the pin 1 may be formed in the coupling B. Hereinafter, the screw joint for a steel pipe having the configuration shown in FIG. 1 will be described as an example.

Figure 2:
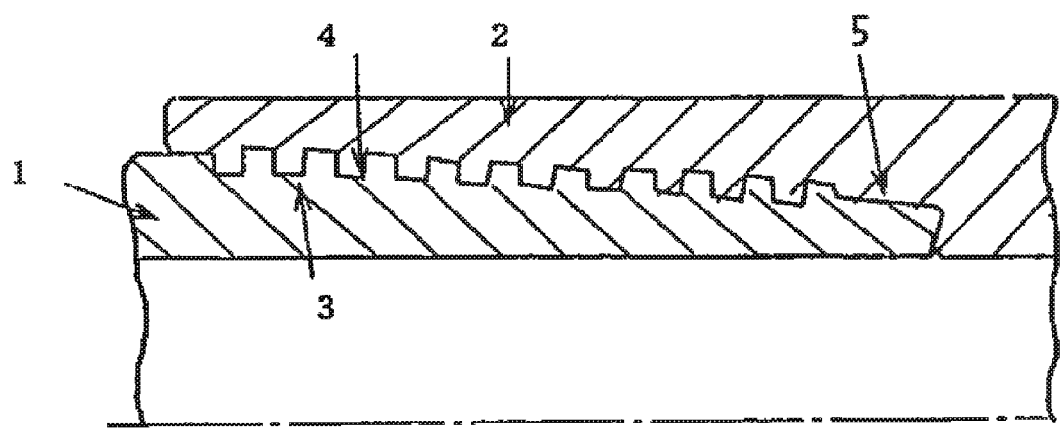
FIG. 2 is an explanatory view schematically showing a fastening part of a screw joint for a steel pipe provided with a threaded portion and an unthreaded metal contact portion.

FIG. 2 is an explanatory view schematically showing the cross section of the fastening part of the screw joint for a steel pipe of FIG. 1. The fitting part of the screw joint for a steel pipe includes the male threaded portion 3, the female threaded portion 4, and the unthreaded metal contact portions 5. In this embodiment, by applying the lubricant film-forming composition to the fitting part (that is, the threaded portion 3 or 4 and the unthreaded metal contact portion 5) of at least one of the pin 1 and the box 2, the grease-like semi-solid lubricant film is formed.

Figure 3:
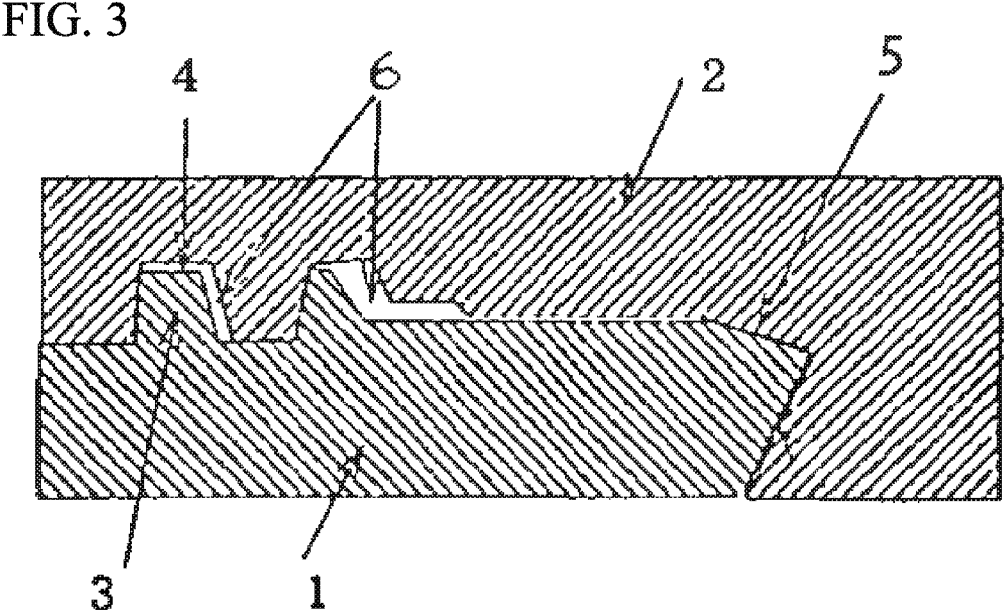
FIG. 3 is an explanatory view schematically showing small gaps between screw thread portion and the unthreaded metal contact portion of the screw joint for a steel pipe.

The pin 1 and the box 2 have shapes that are fitted together. However, when closely observed, as shown in FIG. 3, a small gap 6 particularly occurs between the male threaded portion 3 of the pin 1 and the female threaded portion 4 of the box 2. In addition, a slightly large gap 6 is also provided between the unthreaded metal contact portion 5 and the threaded portion 3. When such gaps 6 are not present, a fastening operation is substantially impossible. As the lubricant component is accumulated in the gaps 6 and leaches to the surroundings due to the pressure during the fastening, seizure is prevented. Accordingly, the gaps 6 contribute to lubrication. Since the lubricant film formed of the lubricant film-forming composition of this embodiment is a semi-solid as the film of the compound grease, the leaching is possible, resulting in excellent lubricity and airtightness.

Since the lubricant film-forming composition of this embodiment also has excellent antirust properties like the compound grease, even after the lubricant film-forming composition is shipped in the state shown in FIG. 1, the fitting part to which the lubricant film-forming composition is applied can be protected from rust.

[Thickness of Lubricant Film]

There may be cases where the excessive contact pressure is added locally when the screw joints for a steel pipe are fastened due to the eccentricity, inclination, and incorporation of foreign matter of the screw joints for a steel pipe caused by the defects in assembly, resulting in plastic deformation. An object of forming the lubricant film on the screw joint for a steel pipe is to prevent seizure even under such severe lubrication conditions. Therefore, introduction of a lubricity imparting component to a friction surface and maintenance thereof are essential.

Therefore, a necessary amount of the lubricant film-forming composition for filling the small gap 6 of the fitting part between screw threads shown in FIG. 3 needs to be applied. When the application amount is small, due to the hydrostatic pressure generated during the fastening, an action of the oil leaching into the friction surface or an action of the lubricity imparting component flowing around from the other gap cannot be expected. Therefore, it is preferable that the thickness of the lubricant film be 10 µm or more.

Since the fitting parts of the pin 1 and the box 2 come into contact with each other during the fastening of the screw joints for a steel pipe, in terms of securing lubricity, it is sufficient to apply the lubricant film only to the fitting part of any one of the pin 1 and the box 2. However, in order to secure antirust properties, it is necessary to form the lubricant films on the fitting parts of both the pin 1 and the box 2. Since the minimum thickness necessary for the antirust properties is also 10 µm, it is preferable that the lubricant film having a thickness of 10 µm or more be formed on each of both of the fitting parts. Here, as shown in FIG. 1, in a case where the coupling B is fastened to one end of the oil well pipe A at the time of shipping, when the lubricant film is formed only on the fitting part of one member of the pin 1 and the box 2 on a side where the fastening is performed, the fitting parts of both the pin 1 and the box 2 are coated with the lubricant films, and thus the antirust properties are also imparted. However, the lubricant films are formed on both the pin 1 and the box 2 (the pin on the left side and the box on the right side in the shown example) on the opposite side.

Since the lubricant film formed of the lubricant film-forming composition of this embodiment has high lubricity, the lubricant film does not need to be thick more than necessary. The material becomes useless when the lubricant film is too thick, and is also against the prevention of the environmental pollution which is one of the objects of this embodiment. Therefore, the upper limit of the film thickness is preferably about 200 µm although not being particularly limited. A more preferable film thickness of the lubricant film is 30 to 150 µm. Here, as described below, in a case where the surface roughness of the applied fitting part needs to be high, it is preferable that the film thickness of the lubricant film be greater than the surface roughness $R_{max}$ of the fitting surface. In a case where surface roughness is provided, the film thickness of the lubricant film is an intermediate value between the maximum and the minimum of the film thickness.

The lubricant film-forming composition of this embodiment may contain a dissolution base for facilitating application. In this case, the composition itself is not semi-solid, but may be in a liquid state having excellent applicability. However, when the composition is applied to the fitting part of the screw joint for a steel pipe, since the dissolution base generally has volatility, the dissolution base is evaporated and removed from the formed lubricant film, and the lubricant film becomes semi-solid. A general organic solvent may be used as the dissolution base. As an example of the dissolution base which is appropriately used in this embodiment, there is a petroleum-based solvent including mineral spirits.

As the application method, an appropriate method may be selected depending on the properties of the lubricant film-forming composition of this embodiment. For example, when the lubricant film-forming composition contains the dissolution base and is in a liquid state at room temperature, a general application method such as spray coating, immersion, or brush coating, may be employed. On the other hand, when the lubricant film-forming composition does not contain the dissolution base and is semi-solid at room temperature, an application device (for example, a spray gun for hot-melt coating) provided with a heating mechanism may be used for the application in a state where the paraffin wax which is the solidifying agent is melted. In this case, in order to form the coating film having an uniform thickness, it is preferable that the lubricant film-forming composition which is pre-heated be applied to the fitting part which is also pre-heated from the spray gun provided with a heat insulating device which can maintain the pre-heated lubricant film-forming composition in a constant temperature.

[Surface Roughness of Fitting Part]

In the fitting part constituted by the threaded portions 3 and 4 and the unthreaded metal contact portions 5 of the screw joint for a steel pipe coated with the lubricant film-forming composition of this embodiment, a surface roughness of 3 to 5 μm can be obtained by cutting work. When the surface roughness is increased by an appropriate method, the lubricity is further improved. This is because the action of the oil leaching into the friction surface and the action of the lubricity imparting component flowing around from the other gap due to the hydrostatic pressure action of the fitting part described above occur due to the oil trapped in the fine uneven portions of the surface roughness. The actions can be achieved by surface roughness regardless of the method of imparting the surface roughness. A preferable surface roughness for enhancing the lubricity is 5 to 40 μm in terms of $R_{max}$. When the surface roughness is higher than 40 μm in terms of $R_{max}$, the surroundings of the concave portions cannot be sufficiently sealed, the hydrostatic pressure action does not occur, and thus sufficient lubricity cannot be obtained. A more preferable range of the $R_{max}$ is 10 to 30 μm.

<Method of Imparting Surface Roughness>

The method of imparting surface roughness is not particularly limited, and the following methods may be employed.

(1) Projection of sand or grid: the surface roughness can be changed by the size of the projected abrasive grain.

(2) Corrosion by acids: a method of immersing in a strong acid solution such as a sulfuric acid, a hydrochloric acid, a nitric acid, and a hydrofluoric acid.

(3) Phosphate treatment: treatment of coating manganese phosphate, zinc phosphate, iron manganese phosphate, and zinc calcium phosphate (the roughness of crystal surfaces is increased with the growth of generated crystals).

(4) Electroplating: copper plating and iron plating (since convex portions are plated first, surfaces become slightly rough). As described above, the copper plating may also be performed to enhance the lubricity of the screw joint for a steel pipe.

(5) Dry mechanical plating: a plating method of projecting grains coated with a plating material onto an iron core using a centrifugal force or air pressure, such as zinc blasting and zinc-iron alloy blasting.

Such surface roughness imparting methods are easily performed on the box 2 side, but may also be performed on the pin 1 side or performed on both of the sides. In addition, since the methods (3) to (5) are methods of forming a base treatment film having a high surface roughness, contact between metals is prevented by the film when the oil film is cut, and thus the enhancement of the lubricity and the antirust properties can be simultaneously obtained. For this reason, the methods (3) to (5) are preferable. Particularly, the manganese phosphate film has coarse surface grains and good oil holding properties of the oil, and thus is more appropriate.

Depending on the material of the oil well pipe A, there may be cases where the phosphate treatment cannot be performed due to high alloys. In this case, after performing the iron plating described in (4), the phosphate treatment may be performed. In a case of the base treatment films of (3) to (5), it is preferable that the thicknesses of the base treatment films be greater than the surface roughness imparted by the methods because the holding properties of the oil and the adhesion of the base film are enhanced. Therefore, it is appropriate that the film thickness of the base treatment film is 5 to 40 μm.

EXAMPLES

The lubricant film-forming compositions of Examples 1 to 6 and Comparative Examples 1 to 9 shown in Table 1 were prepared. As described above, all % is shown in mass %. Among the used components, the paraffin wax was Paraffin Wax 155 manufactured by Nippon Seiro Co., Ltd., calcium sulfonate was Calcinate (registered trademark) C-400W manufactured by Chemtura Corporation, and petrolatum wax was OX-1749 manufactured by Nippon Seiro Co., Ltd. As the other components, chemicals for industrial use were used.

Commercially available compound grease of Comparative Example 2 was Type 3 manufactured by Showa Shell Sekiyu K. K., and commercially available biodegradable grease of Comparative Example 3 was Biotemp PL manufactured by Kyodo Yushi Co., Ltd.

A mineral oil of Example 6 and Comparative Example 9 was a purified mineral oil raw material (viscosity grade: VG32) manufactured by Idemitsu Kosan Co., Ltd., and graphite was AGB-5 manufactured by Ito Graphite Co., Ltd.

TABLE 1

| Examples | Example 1 | Pentaerythritol tetraoleate 60% |
| --- | --- | --- |
| | | Paraffin wax 20% |
| | | Calcium hydroxystearate 20% |
| | Example 2 | Pentaerythritol tetraoleate 70% |
| | | Paraffin wax 15% |
| | | Lithium hydroxystearate 15% |
| | Example 3 | Pentaerythritol tetraoleate 65% |
| | | Paraffin wax 10% |
| | | Calcium hydroxystearate 12.5% |
| | | Hydroxystearic acid lithium 12.5% |
| | Example 4 | Trimethylolpropane coconut oil fatty acid ester 40% |
| | | Paraffin wax 20% |
| | | Lithium hydroxystearate 40% |
| | Example 5 | Trimethylol propane trioleate 80% |
| | | Paraffin wax 10% |
| | | Stearic acid lithium 10% |

TABLE 1-continued

| | Example 6 | Pentaerythritol tetraoleate 59.5%<br>Paraffin wax 8.5%<br>Lithium hydroxystearate 17%<br>Mineral oil 8%<br>Graphite 7% |
|---|---|---|
| Comparative<br>Examples | Comparative<br>Example 1 | Basic calcium sulfonate 60%<br>Petrolatum wax 20%<br>Stearic acid calcium 20% |
| | Comparative<br>Example 2 | Commercially available compound grease |
| | Comparative<br>Example 3 | Commercially available biodegradable grease |
| | Comparative<br>Example 4 | Trimethylol propane trioleate 70%<br>Paraffin wax 30% |
| | Comparative<br>Example 5 | Pentaerythritol tetraoleate 70%<br>Stearic acid calcium 30% |
| | Comparative<br>Example 6 | Paraffin wax 70%<br>Lithium hydroxystearate 30% |
| | Comparative<br>Example 7 | Trimethylolpropane coconut oil fatty acid ester 30%<br>Paraffin wax 30%<br>Stearic acid calcium 40% |
| | Comparative<br>Example 8 | Pentaerythritol tetraoleate 85%<br>Paraffin wax 5%<br>Lithium hydroxystearate 10% |
| | Comparative<br>Example 9 | Pentaerythritol tetraoleate 44%<br>Paraffin wax 4%<br>Lithium hydroxystearate 32%<br>Mineral oil 10%<br>Graphite 10% |

The lubricant film-forming composition was applied to a surface of an appropriate base body for the test of each performance, thereby forming a lubricant film. The application was performed by the brush coating. Regarding the formed lubricant film, biodegradability, lubricity, antirust properties, stickiness resistance, and corrosiveness to copper were examined by the methods described below. The test results are collectively shown in Table 2.

[Biodegradability]

The biodegradability of the lubricant film-forming composition was evaluated by the OECD 301D Closed Bottle method which is generally employed as an evaluation method of biodegradability, for the purpose of evaluating the environmental effect on the ocean. Specifically, for each component in the composition, the biodegradability after 28 days elapsed in water ($BOD_{28}$) was measured by the above-described test method, and the value of the $BOD_{28}$ of the entire composition which is the sum of the blending ratios of the corresponding components was obtained. A case where the obtained $BOD_{28}$ value of the composition is less than 20% was evaluated as poor, a case of 20% or higher and less than 60% was evaluated as fair, a case of 60% or higher and less than 80% was evaluated as good, and a case of 80% or higher was evaluated as excellent. Excellent and good which indicate a $BOD_{28}$ value of 60% or higher are considered as a passing.

[Lubricity]

Figure 4:
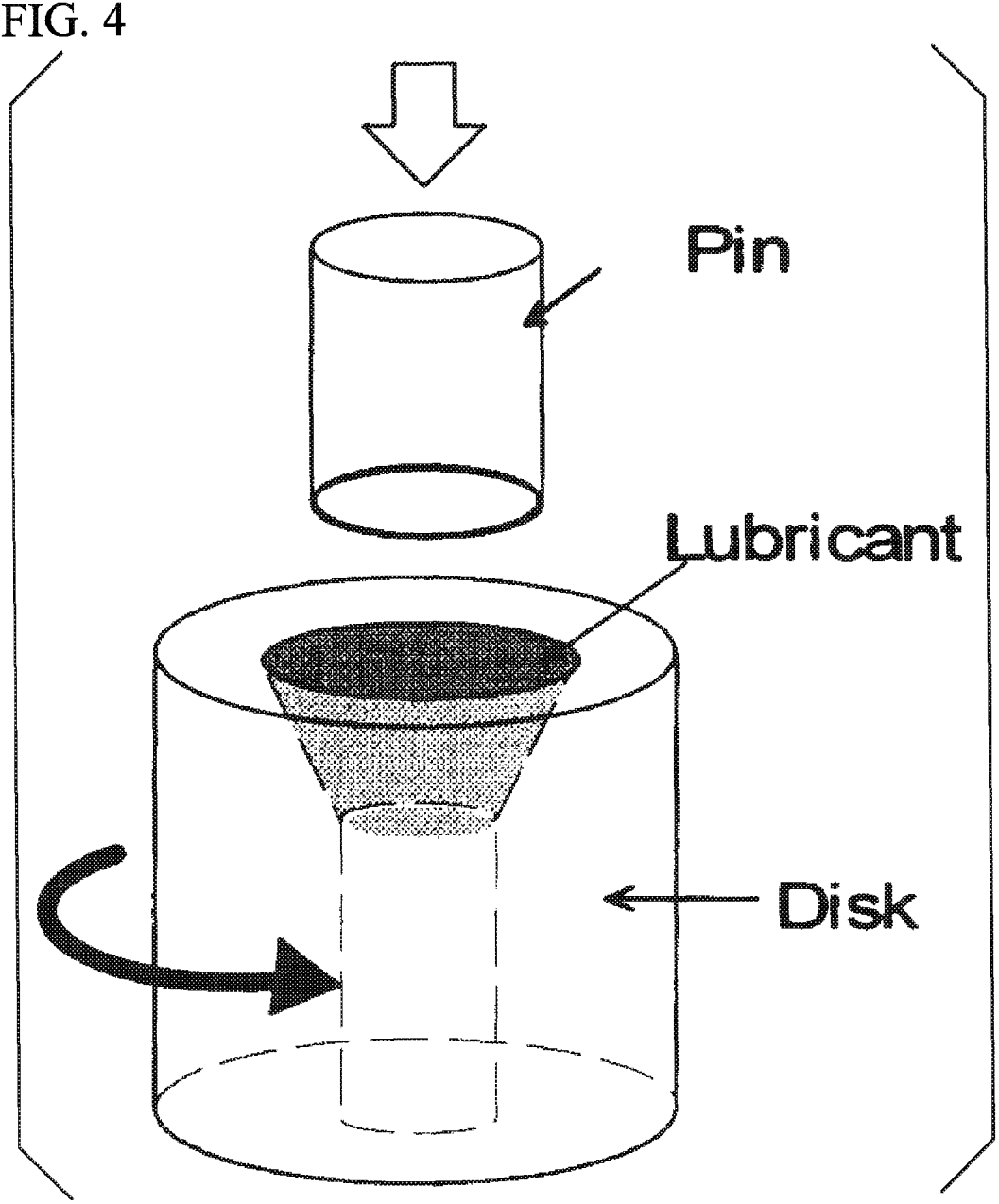
FIG. 4 is a schematic explanatory view of a friction test device used in Examples.

The lubricity was evaluated by a friction test in which fastening and loosening of the screw joint for a steel pipe shown in FIG. 4 are simulated. First, the test was performed by rotating a conical specimen (Disk corresponding to the box) coated with the lubricant film to be tested on the surface and at the same time, pressing a cylindrical specimen (Pin) from above. The load was increased from 1.0 ton by increments of 0.1 tons and the lubricity was evaluated by the maximum load (hereinafter, OK load) at which seizure does not occur. In FIG. 4, Lubricant means the lubricant film.

The test conditions of the friction test are as follows.
Contact type: line contact between the cylinder (pin) and the cone (disk);
Material: SM95TS manufactured by Nippon Steel & Sumitomo Metal Corporation (low alloy carbon steel for a screw joint);
Surface treatment: manganese phosphate treatment only on the disk surface;
Lubricant film: formed by applying the lubricant film-forming composition to be tested by the brush coating on the manganese phosphate film of the disk surface: the film thickness is 50 μm;
Test load: 5 tons at the maximum; and
Rotational speed of the disk: 20 rpm.

A case where the OK load is less than 2.0 tons was evaluated as poor, a case of 2.0 tons or higher and less than 3.0 tons was evaluated as fair, a case of 3.0 tons or higher and less than 4.0 tons was evaluated as good, and a case of 4.0 tons or higher was evaluated as excellent. Excellent and good at which the OK load is 3.0 tons or higher are considered as a passing.

[Antirust Properties]

The evaluation of the antirust properties was performed by a salt spray test (antirust test) specified in JIS Z2371. The lubricant film was formed with a thickness of 30 μm on the surface of a steel sheet (50 mm×100 mm, and a thickness of 2 mm) which is made of the same material as that of the friction test, which is ground without performing a surface treatment thereon, and was used as a specimen. The application was performed by the brush coating. The salt spray test was performed for 500 hours, and presence or absence of the occurrence of rust was checked. A case where slight rust had occurred after the test for 500 hours was evaluated as not good, and a case where no rust had occurred was evaluated as good. Good which indicates that rust did not occur is considered as a passing.

[Stickiness Resistance]

Figure 5:
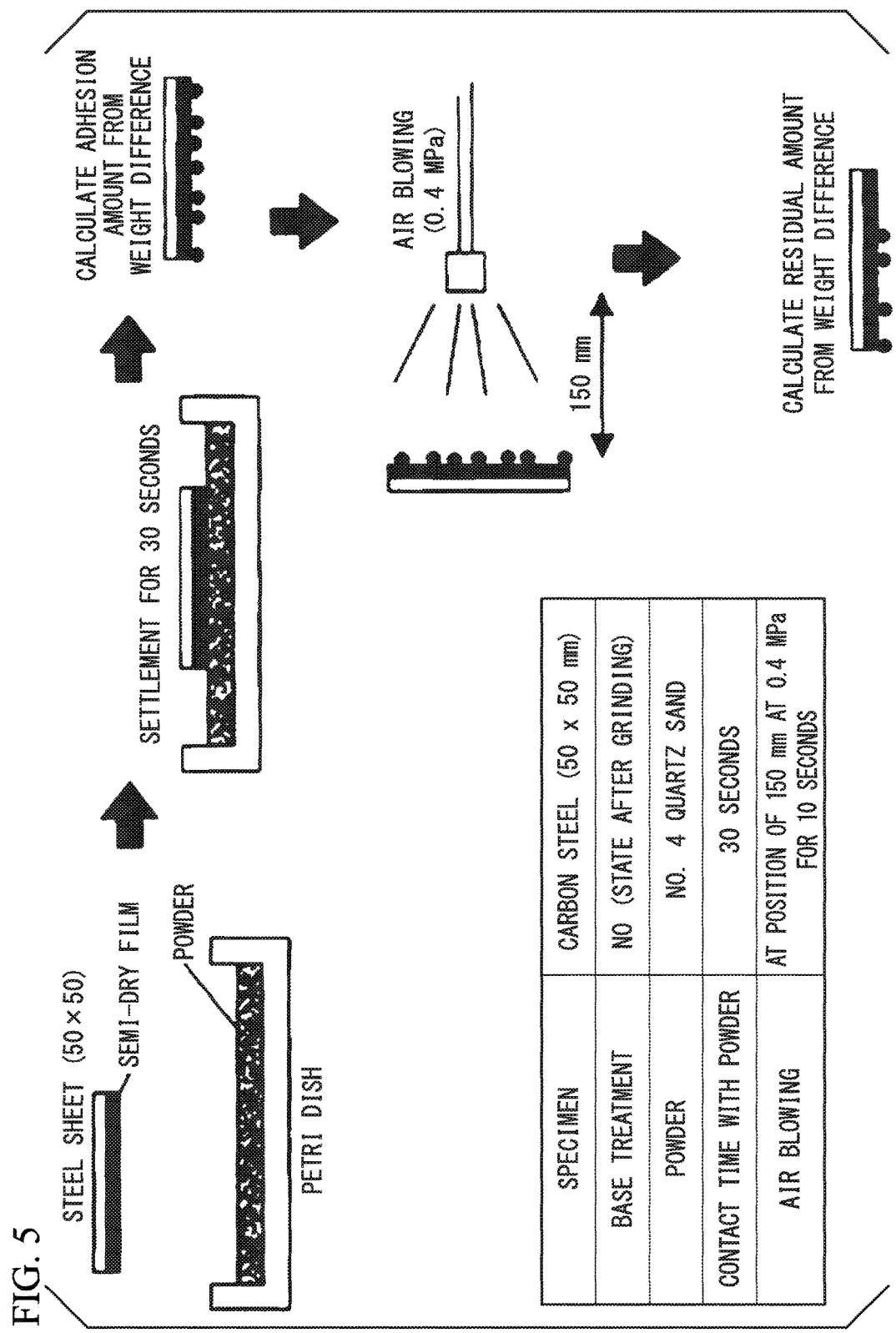
FIG. 5 is an explanatory view showing test conditions of a foreign matter adhesion test for evaluating stickiness resistance in Examples.

The evaluation of the stickiness resistance was performed by a foreign matter adhesion test (stickiness test) shown in FIG. 5. The lubricant film-forming composition to be tested was applied to one surface of a specimen (50×50 mm) made of carbon steel after grinding by the brush coating, thereby forming a lubricant film. The lubricant film surface was caused to face downward, was settled on a petri dish paved with powder (No. 4 quartz sand) for 30 seconds, and the amount of the adhered powder was obtained by the weight difference of the specimen before and after the settlement. Furthermore, the specimen was cause to stand upright, and air blowing at 0.4 MPa was performed on the lubricant film having the powder adhered thereto from a distance of 150 mm for 10 seconds. The amount of the adhered powder which remains after the air blowing was obtained from the weight difference.

A case where the amount of the adhered powder after the air blowing is 5 g or higher was evaluated as poor, a case of 2.5 g or higher and less than 5 g was evaluated as fair, a case of 1 g or higher and less than 2.5 g was evaluated as good, and a case of less than 1 g was evaluated as excellent. Excellent and good which indicate an amount of less than 2.5 g are considered as a passing.

In addition, when the adhesion amount is less than 2.5 g which is considered as a passing in the test, even on the film formed on an actual pipe, it is confirmed that the adhered foreign matter can be similarly removed by general air blowing (a static pressure of 10 kPa and a flow rate of 2.0 m³/min).

[Corrosiveness to Copper]

For the corrosiveness to copper, the lubricant film-forming composition to be tested was applied to a pure copper plate to form a lubricant film having a thickness of 50 μm, and the copper plate was exposed to the atmosphere at 80° C. for 2 hours and was left at room temperature for 4 weeks. The corrosiveness to copper was evaluated by the discoloration of the copper plate after being left for 4 weeks. A case where slight discoloration has occurred was evaluated as not good, a case where no discoloration had occurred was evaluated as good, and good at which no discoloration had occurred is considered as a passing.

TABLE 2

|  | Friction test | Antirust test | Copper plate corrosiveness test | Stickiness test | Biodegradability |
|---|---|---|---|---|---|
| Example 1 | Good 3.5 tons | Good No rust for 500 hours | Good No discoloration | Excellent 0.49 g | Excellent 88.5% |
| Example 2 | Good 3.7 tons | Good No rust for 500 hours | Good No discoloration | Excellent 0.95 g | Excellent 92.2% |
| Example 3 | Excellent 4.2 tons | Good No rust for 500 hours | Good No discoloration | Excellent 0.59 g | Excellent 89.3% |
| Example 4 | Good 3.0 tons | Good No rust for 500 hours | Good No discoloration | Excellent 0.39 g | Good 72.0% |
| Example 5 | Excellent 4.2 tons | Good No rust for 500 hours | Good No discoloration | Good 2.19 g | Excellent 82.0% |
| Example 6 | Good 3.9 tons | Good No rust for 500 hours | Good No discoloration | Good 1.45 g | Good 65.3% |
| Comparative Example 1 | Excellent 4.5 tons | Good No rust for 500 hours | Good No discoloration | Excellent 0.74 g | Excellent 30.4% |
| Comparative Example 2 | Excellent 4.5 tons | Good No rust for 500 hours | Good No discoloration | Poor 8.35 g | Poor Pb contained |
| Comparative Example 3 | Fair 2.9 tons | Not Good Rust had occurred after 100 hours | Not Good Discolored | Poor 9.21 g | Excellent Higher than 95% |
| Comparative Example 4 | Fair 2.5 tons | Good No rust for 500 hours | Good No discoloration | Good 1.20 g | Excellent 93.3% |
| Comparative Example 5 | Good 3.5 tons | Good No rust for 500 hours | Good No discoloration | Poor 5.35 g | Good 70.4% |
| Comparative Example 6 | Poor 1.3 tons | Not Good Rust had occurred after 250 hours | Good No discoloration | Excellent 0.33 g | Good 78.4% |
| Comparative Example 7 | Fair 2.8 tons | Not Good Rust had occurred after 400 hours | Good No discoloration | Excellent 0.82 g | Good 75.7% |
| Comparative Example 8 | Excellent 4.1 tons | Good No rust for 500 hours | Good No discoloration | Poor 5.91 g | Good 76.8% |
| Comparative Example 9 | Excellent 4.1 tons | Not Good Rust had occurred after 350 hours | Good No discoloration | Excellent 0.92 g | Fair 58.8% |

As can be seen from Table 2, the lubricant film formed of the lubricant film-forming composition according to this embodiment showed performance which is considered as a passing at all the test items regarding the biodegradability, the lubricity, the antirust properties, the stickiness resistance, and the corrosiveness to copper.

On the other hand, Comparative Examples showed insufficient results in a few test items.

INDUSTRIAL APPLICABILITY

According to the present invention, it is possible to provide a lubricant film-forming composition having excellent lubricity, antirust properties, biodegradability, stickiness resistance, and corrosiveness to copper and a screw joint for a steel pipe having the lubricant film-forming composition.

BRIEF DESCRIPTION OF THE REFERENCE SYMBOLS

1: PIN
2: BOX
3: MALE THREADED PORTION

4: FEMALE THREADED PORTION
5: UNTHREADED METAL CONTACT PORTION
6: SMALL GAP OF FITTING PART BETWEEN SCREW THREADS
A: OIL WELL PIPE
B: COUPLING

The invention claimed is:

1. A lubricant film-forming composition, comprising, as a composition:
    40 to 80 mass % of a base oil selected from the group consisting of pentaerythritol fatty acid ester, trimethylolpropane fatty acid ester, and mixtures thereof;
    5 to 20 mass % of a solidifying agent consisting of paraffin wax; and
    10 to 40 mass % of a solid lubricant selected from the group consisting of alkali metal salt of hydroxystearic acid, alkali earth metal salt of hydroxystearic acid, and mixtures thereof, wherein
    a total content of the base oil, the solidifying agent, and the solid lubricant is 85 mass % or more and 100 mass % or less, and
    the lubricant film-forming composition does not contain Pb or Zn.

2. The lubricant film-forming composition according to claim 1, wherein
    the base oil is selected from the group consisting of pentaerythritol tetraoleate, trimethylol propane trioleate, trimethylol propane triisostearate, and mixtures thereof.

3. The lubricant film-forming composition according to claim 1, wherein
    the solid lubricant is selected from the group consisting of calcium hydroxystearate, lithium hydroxystearate, sodium hydroxystearate, and mixtures thereof.

4. A screw joint for steel pipe, the screw joint comprising:
    a pin; and
    a box, wherein
    each of the pin and the box has a threaded portion and an unthreaded metal contact portion as fitting parts,
    the screw joint for steel pipe is provided with a lubricant film, which is formed of the lubricant film-forming composition according to claim 1, on a surface of the fitting part of at least one of the pin and the box.

5. The lubricant film-forming composition according to claim 2, wherein
    the solid lubricant is selected from the group consisting of calcium hydroxystearate, lithium hydroxystearate, sodium hydroxystearate, and mixtures thereof.

6. A screw joint for steel pipe, the screw joint comprising:
    a pin; and
    a box, wherein
    each of the pin and the box has a threaded portion and an unthreaded metal contact portion as fitting parts,
    the screw joint for steel pipe is provided with a lubricant film, which is formed of the lubricant film-forming composition according to claim 2, on a surface of the fitting part of at least one of the pin and the box.

7. A screw joint for steel pipe, the screw joint comprising:
    a pin; and
    a box, wherein
    each of the pin and the box has a threaded portion and an unthreaded metal contact portion as fitting parts,
    the screw joint for steel pipe is provided with a lubricant film, which is formed of the lubricant film-forming composition according to claim 3, on a surface of the fitting part of at least one of the pin and the box.

8. A lubricant film-forming composition, comprising, as a composition:
    40 to 80 mass % of a base oil comprising one or more of pentaerythritol fatty acid ester or trimethylolpropane fatty acid ester;
    5 to 20 mass % of a solidifying agent comprising paraffin wax; and
    10 to 40 mass % of a solid lubricant comprising one or more of alkali metal salt of hydroxystearic acid or alkali earth metal salt of hydroxystearic acid, wherein
    a total content of the base oil, the solidifying agent, and the solid lubricant is 85 mass % or more and 100 mass % or less, and
    the lubricant film-forming composition does not contain Pb or Zn.

* * * * *